US008812523B2

(12) United States Patent
Marwah et al.

(10) Patent No.: US 8,812,523 B2
(45) Date of Patent: Aug. 19, 2014

(54) PREDICATE RESULT CACHE (71) Applicant: Oracle International Corporation, Redwood Shores, CA (US)

(72) Inventors: Vineet Marwah, San Ramon, CA (US); Teck Hua Lee, Belmont, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/631,434

(22) Filed: Sep. 28, 2012

(65) Prior Publication Data

US 2014/0095517 A1    Apr. 3, 2014

(51) Int. Cl.
*G06F 7/00*    (2006.01)

(52) U.S. Cl.
USPC .......................................... 707/754

(58) Field of Classification Search
USPC .......................................... 707/754
See application file for complete search history.

(56) References Cited

U.S. PATENT DOCUMENTS

| | | | |
|---|---|---|---|
| 6,018,747 A | 1/2000 | Burns et al. |
| 6,061,697 A | 5/2000 | Nakao |
| 6,414,610 B1 | 7/2002 | Smith |
| 6,598,055 B1 | 7/2003 | Keesey et al. |
| 6,671,853 B1 | 12/2003 | Burkett et al. |
| 6,883,137 B1 | 4/2005 | Girardot et al. |
| 6,941,510 B1 | 9/2005 | Ozzie et al. |
| 6,996,571 B2 | 2/2006 | McConnell |
| 7,013,425 B2 | 3/2006 | Kataoka |
| 7,031,956 B1 | 4/2006 | Lee et al. |
| 7,080,094 B2 | 7/2006 | Dapp et al. |
| 7,090,318 B2 | 8/2006 | Brown |
| 7,143,397 B2 | 11/2006 | Imaura |
| 7,302,489 B2 | 11/2007 | Kraft |
| 7,340,673 B2 | 3/2008 | Malone |
| 7,464,082 B2 | 12/2008 | Weiss |
| 7,484,171 B2 | 1/2009 | Jeon et al. |

(Continued)

FOREIGN PATENT DOCUMENTS

| | | |
|---|---|---|
| WO | WO 03/107576 | 12/2003 |
| WO | WO 03107576 | 12/2003 |
| WO | WO 2006026534 | 3/2006 |

OTHER PUBLICATIONS

Balmin et al., "Incremental Validation of XML Documents", ACM Trans. Database System, Dec. 24, 2004, 42 pages.

(Continued)

*Primary Examiner* — Apu Mofiz
*Assistant Examiner* — Ajith Jacob
(74) *Attorney, Agent, or Firm* — Hickman Palermo Truong Becker Bingham Wong LLP (57) ABSTRACT

In token compression, a column value is represented by a encoded token. During early predicate evaluation, the result that a decoded token in a column does not satisfy a predicate condition in a predicate conjunction is recorded in a cache as a "FALSE". Such a result not only means that when the column contains that token that the predicate condition is not satisfied, but also that a predicate conjunction containing the predicate condition is not satisfied. When performing early predicate evaluation on a subsequent row on a token in a column, the conjunction result cache is referred to. If the cache records a FALSE for that token in that column, then it is known the predicate conjunction cannot be satisfied by the decoded token.

30 Claims, 3 Drawing Sheets

(56) References Cited

U.S. PATENT DOCUMENTS

| | | | |
|---|---|---|---|
| 7,586,839 | B2 | 9/2009 | Childress et al. |
| 7,730,104 | B2 | 6/2010 | Uchiyama et al. |
| 7,774,321 | B2 | 8/2010 | Tomic et al. |
| 7,779,350 | B2 | 8/2010 | Bender et al. |
| 7,831,540 | B2 | 11/2010 | Medi et al. |
| 7,844,632 | B2 | 11/2010 | Zhou et al. |
| 7,877,356 | B1 | 1/2011 | Guiheneuf et al. |
| 8,046,699 | B2 | 10/2011 | Mohan et al. |
| 8,073,841 | B2 | 12/2011 | Tarachandani et al. |
| 8,150,818 | B2 | 4/2012 | Van Der Linden et al. |
| 2001/0037346 | A1 | 11/2001 | Johnson |
| 2002/0075514 | A1 | 6/2002 | Wright et al. |
| 2002/0111965 | A1 | 8/2002 | Kutter |
| 2002/0123993 | A1 | 9/2002 | Chau et al. |
| 2003/0046317 | A1 | 3/2003 | Cseri et al. |
| 2003/0069881 | A1 | 4/2003 | Huttunen |
| 2003/0093626 | A1 | 5/2003 | Fister |
| 2003/0101235 | A1 | 5/2003 | Zhang |
| 2004/0060006 | A1 | 3/2004 | Lindblad et al. |
| 2004/0068509 | A1 | 4/2004 | Garden et al. |
| 2004/0068696 | A1 | 4/2004 | Seyrat et al. |
| 2004/0143791 | A1 | 7/2004 | Ito et al. |
| 2004/0148278 | A1 | 7/2004 | Milo et al. |
| 2004/0267760 | A1 | 12/2004 | Brundage et al. |
| 2004/0268244 | A1 | 12/2004 | Levanoni et al. |
| 2004/0268305 | A1 | 12/2004 | Hogg et al. |
| 2005/0033733 | A1 | 2/2005 | Shadmon et al. |
| 2005/0044113 | A1 | 2/2005 | Manikutty et al. |
| 2005/0050054 | A1 | 3/2005 | Clark et al. |
| 2005/0086608 | A1 | 4/2005 | Roessler |
| 2005/0091188 | A1 | 4/2005 | Pal et al. |
| 2005/0097084 | A1 | 5/2005 | Balmin et al. |
| 2005/0108209 | A1 | 5/2005 | Beyer et al. |
| 2005/0114316 | A1 | 5/2005 | Fontoura et al. |
| 2005/0187973 | A1 | 8/2005 | Brychell et al. |
| 2005/0228786 | A1 | 10/2005 | Murthy et al. |
| 2005/0228791 | A1 | 10/2005 | Thusoo et al. |
| 2005/0228828 | A1 | 10/2005 | Chandrasekar et al. |
| 2005/0278289 | A1 | 12/2005 | Gauweiler et al. |
| 2005/0278616 | A1 | 12/2005 | Eller |
| 2005/0289125 | A1 | 12/2005 | Liu et al. |
| 2006/0021246 | A1 | 2/2006 | Schulze et al. |
| 2006/0031757 | A9 | 2/2006 | Vincent |
| 2006/0136508 | A1 | 6/2006 | Idicula et al. |
| 2006/0143340 | A1 | 6/2006 | Labar |
| 2006/0167912 | A1 | 7/2006 | Coulson et al. |
| 2006/0168513 | A1 | 7/2006 | Coulson et al. |
| 2006/0195783 | A1 | 8/2006 | Davis et al. |
| 2006/0212467 | A1 | 9/2006 | Murphy et al. |
| 2006/0242559 | A1 | 10/2006 | Krantz et al. |
| 2006/0277179 | A1 | 12/2006 | Bailey |
| 2007/0044012 | A1 | 2/2007 | Suver et al. |
| 2007/0079234 | A1 | 4/2007 | McCollum et al. |
| 2007/0271305 | A1 | 11/2007 | Chandrasekar et al. |
| 2008/0077606 | A1 | 3/2008 | Fang et al. |
| 2008/0098001 | A1 | 4/2008 | Gupta et al. |
| 2008/0098019 | A1 | 4/2008 | Sthanikam et al. |
| 2008/0098020 | A1 | 4/2008 | Gupta et al. |
| 2008/0104025 | A1 | 5/2008 | Dharamshi et al. |
| 2008/0195933 | A1 | 8/2008 | McKellar et al. |
| 2008/0294676 | A1 | 11/2008 | Faerber et al. |
| 2009/0094236 | A1 | 4/2009 | Renkes et al. |
| 2009/0141629 | A1 | 6/2009 | Gerosa et al. |
| 2009/0150412 | A1 | 6/2009 | Idicula et al. |
| 2009/0248648 | A1* | 10/2009 | Johnson et al. ............ 707/4 |
| 2012/0109910 | A1 | 5/2012 | Netz et al. |
| 2013/0060780 | A1 | 3/2013 | Lahinri et al. |

OTHER PUBLICATIONS

Bayardo et al., "Optimizing encoding: An evaluation of binary XML encoding optimizations for fast stream based XML processing", May 2004, Proceedings of the 13$^{th}$ International Conference on World Wide Web WWW 04, Publisher ACM press, pp. 345-354.

Bouchou et al., "Updates and Incremental Validation of XML Documents", LNCS 2921, 2004, pp. 216-232.

Catania et al., Lazy XML Updates: Laziness as a Virtue of Update and Structural Join Efficiency, SIGMOD 2005 Jun. 14-16, 2005, pp. 515-526.

Kanne et al., "Efficient Storage of XML data", Dec. 13, 1999, pp. 1-22.

Kim et al., "An Efficient XML Index Technique with Relative Position Coordinates", Dept. of Computer Science, Seoul, South Korea, WSEAS Transaction on Information Science and Applicaltions, vol. 2, No. 4, Apr. 2005, pp. 373-379.

La Fontaine et al., "A delta Format for XML: Identifying Changes in XML Files and Representing the Changes in XML", 2001, 26 pages.

Liefke et al., "Xmill: An efficient compressor for XML data", May 2000, ACM SIGMOD Record, Proceedings of the 2000 ACM SIGMOD international conference on Management of data SIGMOD 00', vol. 29, Issue 2, Publisher: ACM Press, pp. 153-164.

Liu et al., "Configurable indexing and ranking for XML information retrieval", Jul. 2004, Proceedings of the 27$^{th}$ annual international ACM SIGIR conference on Research and Development in information retrieval SIGIR 04, Published by ACM Press. pp. 88-95.

Min et al., "XML Indexing and compression: XPRESS: a queriable compression for XML data", Jun. 2003, Proceedings of the 2003 ACM SIGMOD international conference on Management of data SIGMOD 03, Published by ACM Press, pp. 122-133.

PCT/US2007/010163, Notification of Transmittal of the International Search Report and Written Opinion of the International Searching Authority, Oct. 12, 2007, 12 pages.

"WAP Binary XML Content Format" downloaded from the Internet Nov. 9, 2007 <http://www.w3.org/TR/wbxm/> 15 pages.

"What's New in the XDK?" downloaded from the Internet Nov. 9, 2007 <http://download.oracle.com/docs/cd/B28359_01/appdev.1111b28394/whatsnew.htm > 3 pages.

Wong, "The Extended XQL for Querying and Updating Large XML Databases", DocEng '07, Nov. 9-10, 2001, pp. 95-104.

Yu et al., "Dynamically updating XML Data: Numbering Scheme Revisited", Internet and Web Information Systems, 8, 2005, pp. 5-26.

Zou et al., "XML Processing: Ctree:a compact tree for indexing XML data", Nov. 2004, Proceedings of the 6$^{th}$ annual international workshop on Web information and data management WIDM '04, Published by ACM Press, pp. 39-46.

"3 Using Oracle XML DB" downloaded from the Internet Nov. 9, 2007 <http://download.oracle.com/docs/cd/B28359_01/appdev.111/b28369/xdb03usg.htm> 63 pages.

"4 XML Parsing for Java" downloaded from the Internet Nov. 9, 2007 <http://download.oracle.com/docs/cd/B28359_01/appdev.111/b28394/adx_j_parser.htm> 42 pages.

"4 XMLType Operations" downloaded from the Internet Nov. 9, 2007 <http://download.oracle.com/docs/cd/B28359_01/appdev.111/b28369/xdb04cre.htm> 29 pages.

"20 Using the XML Schema Processor for C" downloaded from the Internet Nov. 9, 2007 <http://download.oracle.com/docs/cd/B28359_01/appdev.111/b28394/adx_c_sproc.htm> 10 pages.

Zhang et al., "TDX: A High Perfomrance Table-driven XML Parser", In proceedings of the 44$^{th}$ annual (ACM) Southeast Regional Conference, Mar. 2006, ACM, pp. 726-731.

U.S. Appl. No. 11/437,512, filed May 18, 2006.

U.S. Appl. No. 11/437,512, filed May 18, 2006, Office Action, Aug. 5, 2009.

U.S. Appl. No. 11/437,512, filed May 18, 2006, Office Action, Mar. 16, 2010.

U.S. Appl. No. 11/437,512, filed May 18, 2006, Office Action, Oct. 4, 2010.

U.S. Appl. No. 11/437,512, filed May 18, 2006, Office Action, Mar. 28, 2011.

U.S. Appl. No. 11/437,512, filed May 18, 2006, Office Action, Nov. 1, 2012.

U.S. Appl. No. 13/553,722, filed Jun. 26, 2012, Office Action, Aug. 27, 2013.

U.S. Appl. No. 11/437,512, filed May 18, 2006, Advisory Action, May 10, 2013.

U.S. Appl. No. 11/437,512, filed May 18, 2006, Final Office Action, Mar. 1, 2013.

U.S. Appl. No. 13/224,327, filed Sep. 2, 2011, Office Action, Mar. 14, 2013.

(56) References Cited

OTHER PUBLICATIONS

Ozden, Mustafa, "A Binary Encoding for Efficient XML Processing", Dec. 17, 2002, pp. 81-102.
Ozden, Mustafa, "A Binary Encoding for Efficient XML Processing", Dec. 17, 2002, 114 pages.
"WD97: How Word for Windows Uses Temporary Files" dated Nov. 16, 2006, downloaded from the Internet on Jan. 28, 2011, <http://support microsoft.com/kb/89247> 6 pages.
Kanne et al., "Efficient Storage of XML Data", dated Jun. 16, 1999, 20 pages.

* cited by examiner

TABLE 101

| LNAME | FNAME | CITY | STATE |
|---|---|---|---|
| TAYLOR | THOMAS | SAN JOSE | CA |
| TAYLOR | JAMES | SAN JOSE | CA |
| THOMAS | TAYLOR | SAN JOSE | NM |
| THOMAS | JAMES | SAN JOSE | CA |
| ADAMS | DEBRA | SAN JOSE | CA |
| ... | ... | ... | ... |

111, 112, 113, 114, 115

| TOKEN DICTIONARY 102 | |
|---|---|
| ADAMS | $S_0$ |
| TAYLOR | $S_1$ |
| THOMAS | $S_2$ |
| JAMES | $S_3$ |
| SAN JOSE | $S_4$ |

CONJUNCTION RESULT CACHE 103

"$S_n$ = ( UNCHECKED, TRUE, FALSE )"

SLOT - "LNAME" | $S_0$ | $S_1$ | $S_2$ | $S_3$ | $S_4$ |
SLOT - "FNAME" | $S_0$ | $S_1$ | $S_2$ | $S_3$ | $S_4$ |
SLOT - "CITY" | $S_0$ | $S_1$ | $S_2$ | $S_3$ | $S_4$ |
SLOT - "STATE" | $S_0$ | $S_1$ | $S_2$ | $S_3$ | $S_4$ |

PREDICATE CONJUNCTION 104

( LNAME like "T*" ) and ( LNAME Like "*S" ) and ( CITY = "SAN JOSE" )

PREDICATE RESULT CACHE

FIELD OF THE INVENTION

The present invention relates to processing queries against tabular data, such as data stored in an object-relational database.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers are used to store and manage many types of data. Tabular data is one common form of data that computers are used to manage. Tabular data refers to any data that is logically organized into rows and columns. For example, word processing documents often include tables. Data that resides in such tables is tabular data. Data contained in a spreadsheet is also tabular data. Further, data stored in relational tables, or similar database structures, is tabular data.

Logically, tabular data resides in a table-like structure, such as a spreadsheet or relational table. However, the actual physical storage of the tabular data may take a variety of forms. For example, the tabular data from a spreadsheet may be stored within a spreadsheet file, which in turn is stored in a set of disk blocks managed by an operating system. As another example, tabular data that belongs to a relational database table may be stored in a set of disk blocks managed by a database server.

How tabular data is physically stored can have a significant effect on (1) how much storage space the tabular data consumes, and (2) how efficiently the tabular data can be accessed and manipulated. If physically stored in an inefficient manner, the tabular data may consume more storage space than desired, and result in slow retrieval, storage and/or update times.

Often, the physical storage of tabular data involves a tradeoff between size and computational overhead. For example, a relational table may be stored compressed or uncompressed. If compressed, the relational table occupies less storage space, but computational overhead is incurred to decompress or compress rows when the rows are retrieved and stored. Such overhead is referred to herein as compression overhead.

An operation in which the tradeoff between computational overhead and space is accentuated is a scan-and-filter operation. A scan-and-filter operation retrieves rows and filters the rows according to one or more "filtering criteria" based on column values in the rows. The scan-and-filter operation returns only the rows that satisfy the filtering criteria. Even though only some rows are returned, all rows retrieved may be decompressed in order to determine whether column values contained therein satisfy filtering criteria. Thus, while compression reduces the space used to store rows, compression exacts an overhead on a scan-and-filter operation on the rows. Described herein are approaches for performing a scan-and-filter operation on compressed tabular data that reduce compression overhead.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are approaches for reducing the compression overhead incurred to perform a scan-and-filter operation on tabular data that is compressed using token compression. The approaches improve a form of query evaluation referred to herein as early predicate evaluation. Early predicate evaluation is performed to determine whether a row satisfies filtering criteria, where the filtering criteria is a predicate conjunction. A predicate conjunction is a conjunction of multiple predicate conditions. In early predicate evaluation, the columns referred to by a predicate conjunction are initially read, decompressed if needed, and evaluated. When a column value is encountered that does not satisfy a predicate condition in a predicate conjunction, it means that the row cannot satisfy the predicate conjunction. Evaluation of other predicate conditions in the predicate conjunction and possible decoding of other column values are bypassed and avoided.

In token compression, a column value is represented by a token that typically has a much smaller memory size than the column value. A token dictionary maps the column value to the token. Decoding a token entails determining the value it is mapped to by the dictionary and substituting the value for the token.

During early predicate evaluation, the result that a decoded token in a column does not satisfy a predicate condition is recorded in a cache as a "FALSE". Such a result not only means that when the column contains that token that the predicate condition is not satisfied, but also that the predicate conjunction is not satisfied. When performing early predicate evaluation on a subsequent row on a token in a column, the conjunction result cache is referred to. If the cache records a FALSE for that token in that column, then the predicate conjunction cannot be satisfied by the decoded token. There is no need to decode the token and no need to evaluate other predicate conditions in the predicate conjunction or decode other tokens in the row. Using a cache in this way is referred to herein as conjunction result caching.

Database Systems

A database management system ("DBMS") stores tabular data in the form of, for example, relational or object-relation tables. Embodiments of the present invention are illustrated herein in the context of a DBMS. Therefore, a description of a DBMS is useful. It should be understood, however, that embodiments of the present invention are not limited to relational data, or data stored in a DBMS.

A DBMS manages a database. A DBMS may comprise one or more database servers. A database comprises database data and a database dictionary that are stored on a persistent memory mechanism, such as a set of hard disks or flash memory devices. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server.

A database command may be in the form of a database statement that conforms to a database language. A database language for expressing database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Compression Unit

A token dictionary maps tokens to the respective values represented by the tokens. One or more data storage structures that store a body of values compressed according to a token dictionary are referred to herein in this application as compression units. For tabular data, a compression unit comprises a compressed set of rows and one or more columns of the set, where at least a portion of the values in the set of rows is compressed according to a token dictionary. For example, rows in a table may comprise 10 columns. A compression unit may comprise a number of the table's rows and store all 10 columns of the rows. Alternatively, a compression unit may comprise a number of the table's rows but only store five columns for those rows, or even a single column for those rows. In addition, not all column values in the compression unit need be encoded into tokens. In an embodiment of the present invention, a compression unit may contain a token dictionary used to encode column values in the compression unit.

An example of a compression unit is a database data block, referred to herein as a data block. A data block is a unit of persistent storage; a data block is used by a database server to store database records (e.g. to store rows of a table, to store column values of a column). When records are read from persistent storage, a data block containing the record is copied into a data block buffer in volatile memory of a database server. A data block usually contains multiple rows, and control and formatting information, (e.g. offsets to sequences of bytes representing rows or other data structures, list of transactions affecting a row).

A data block is referred to as being atomic because, at least in part, a data block is the smallest unit of database data a database server may request from a persistent storage device. For example, when a database server seeks a row that is stored in a data block, the database server may only read the row from persistent storage by reading in the entire data block.

In an embodiment, a data block that is a compression unit stores the token dictionary for the data block in the data block. The domain of the token dictionary is the data block and it may be used to tokenize column values of rows in the data block. A database can store compressed data in a larger number of data blocks, each of which contains a token dictionary specific to the data block. Embodiments of the present invention are illustrated using database data blocks that contain a token dictionary specific to the column values in the data block.

Conjunction Result Cache

In conjunction result caching, the result of evaluating a token's decoded value is stored in a conjunction result cache element, which is referred to herein as simply an element. The size and complexity of a conjunction result cache affects the efficiency with which early predicate evaluation is performed when using conjunction result caching. In an embodiment of the present invention, the number of elements is based on two dimensions, a number of columns and a number of entries in a token dictionary. There is an element for each combination of a column in a data block and entry in a token dictionary.

Figure 1:
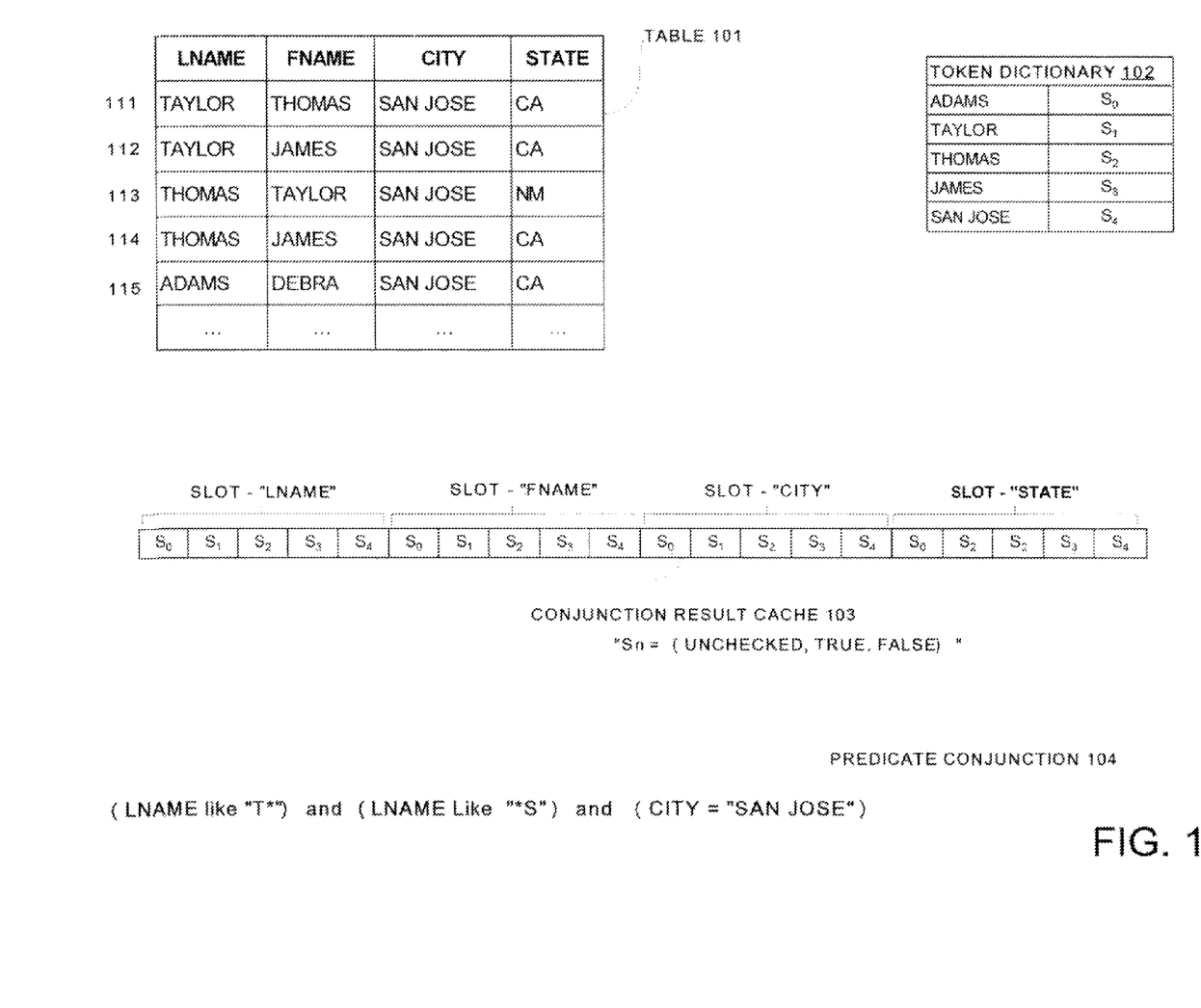
FIG. 1 is a diagram depicting a conjunction result cache and related data structures according to an embodiment of the present invention.

FIG. 1 is a diagram depicting a conjunction result cache, and rows of a table that are stored in a data block, and a token dictionary, which are used to illustrate approaches for conjunction result caching.

Referring to FIG. 1, it depicts Table 101. Table 101 comprises columns LNAME, FNAME, CITY, and STATE. The rows in Table 101 depicted in FIG. 1 are in a data block containing column values tokenized according to Token Dictionary 102.

According to an embodiment, token dictionaries in a body of data blocks have a pre-determined fixed number of entries. One or more of the entries map a token to a value represented by the token. Token Dictionary 102 has five entries. For example, Token Dictionary 102 maps column value "SAN JOSE" to token $S_4$, the subscript 4 representing that the token corresponds to entry 4 of Token Dictionary 102 (i.e. the fifth entry).

Conjunction result cache 103 is dimensioned according to the number of columns of table 101 and the number token entries in a token dictionary. Table 101 has four columns and token dictionary 102 has five token entries. Accordingly, conjunction result cache 103 has twenty elements. For each column of table 101, there is an element for each of the five entries of Token Dictionary 102. The elements in conjunction result cache 103 that correspond to one column are referred to as a slot. In conjunction result cache 103 there is a slot for LNAME, FNAME, CITY, and STATE. Each slot comprises a sequence of elements, each corresponding to an entry in Token Dictionary 102, the sequence being ordered according to the token entry positions in Token Dictionary 102. Accordingly, each slot in FIG. 1 includes in order an element for $S_0$, $S_1$, $S_2$, $S_3$, and $S_4$.

Each element in conjunction result cache 103 can be set to one of three states. To explain the semantics and use of these states, it useful to do so in the context of a predicate conjunction.

FIG. 1 depicts predicate conjunction 104, which has three predicates (LNAME like "T*"), (LNAME like "*S") and (CITY="SAN JOSE"). The "like" operator in several of the predicates requires that a string value in a column match criteria indicated by the string, which may contain wild card characters. The predicate (LNAME like "T*") is satisfied by a value only if the string begins with "T" followed by any number of characters. The predicate (LNAME like "*S") is satisfied by a string only if the string ends with an "S". The "like" operator is a very expensive operate to evaluate. Avoiding evaluation of the operator for many rows can significantly reduce overhead.

The three states to which an element may be set are UNCHECKED, TRUE, and FALSE. When a token result cache is initialized for early predicate evaluation of rows in a data block, the elements are set to UNCHECKED. The FALSE state in a particular element of a column's slot specifies that the respective token in that column did not satisfy at least one predicate condition in the predicate conjunction, and concomitantly, the entire predicate conjunction. The state is set to FALSE, even though the decoded token in that column satisfies another predicate condition in the predicate conjunction.

For example, assume row 111 is the first row being evaluated in a data block. The first predicate condition evaluated is (LNAME like "T*"). Column value "TAYLOR" in LNAME satisfies this predicate condition. $S_1$ in the slot for LNAME is changed from UNCHECKED to TRUE. The next predicate condition evaluated is (LNAME like "*S"). The column value "TAYLOR" fails this predicate condition. Accordingly, the element for $S_1$ in the slot for column LNAME is set to FALSE.

When evaluating the first predicate condition for row 112, a cache look up on conjunction result cache 103 is performed for column LNAME and token $S_1$. It is determined that the element for column LNAME and token $S_1$ is set to FALSE. From this lookup result it is determined that row 112 cannot satisfy predicate conjunction 104.

The set of columns that are arguments for any predicate condition in a predicate conjunction is referred to herein as a conjunction column set. For a particular column in the conjunction column set of a predicate conjunction, the predicate condition in the predicate conjunction for which the particular column is an argument is referred to herein as a pertinent predicate condition for the column. LNAME and CITY comprise the conjunction column set for predicate conjunction 104. Both predicate condition (LNAME like "T*") and predicate condition (LNAME like "*S") are a pertinent predicate condition for column LNAME.

Early Predicate Evaluation with Conjunction Result Caching

Figure 2:
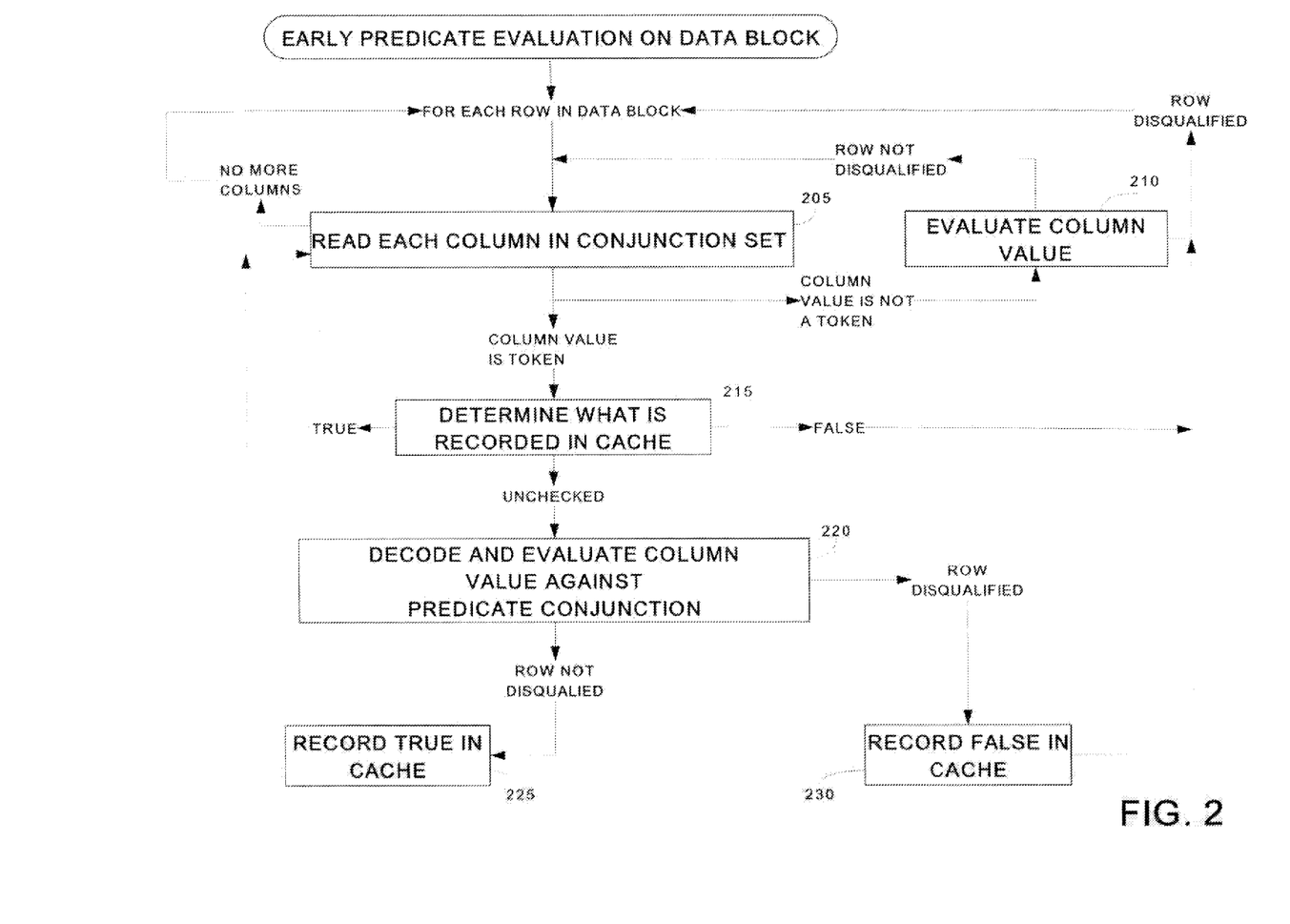
FIG. 2 is a diagram depicting a procedure used for early predicate evaluation using conjunction result caching according to an embodiment of the present invention.

FIG. 2 is a flowchart depicting operations in a procedure that may be used for early predicate evaluation using conjunction result caching. The procedure may be performed by a data base server to execute a scan-and-filter operation on a body of date blocks to compute a query that specifies a predicate conjunction.

Figure 3:
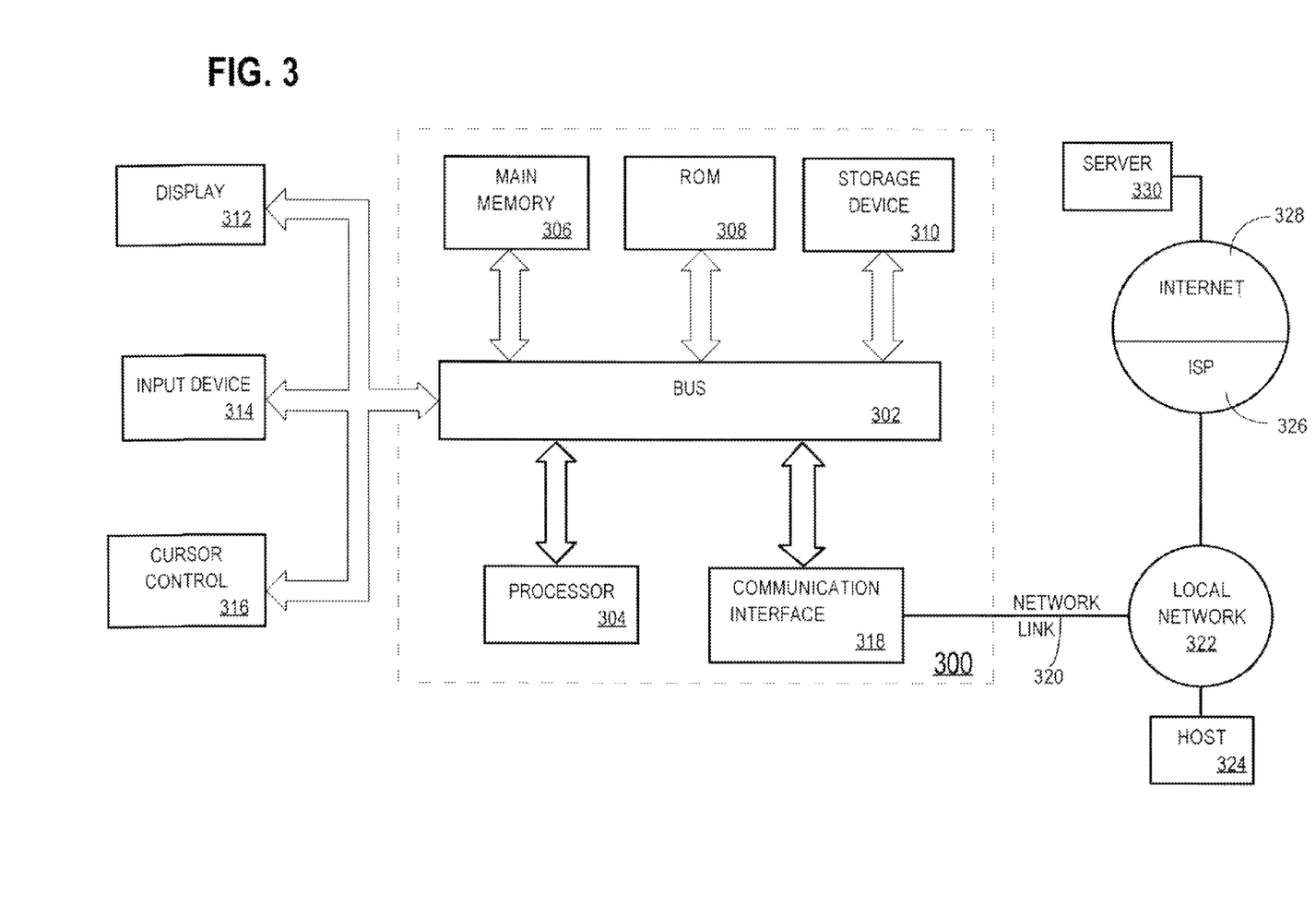
FIG. 3 is a diagram depicting a computer system that may be used in an embodiment of the present invention.

The structures shown in FIG. 1 are used to illustrate an embodiment of the present invention. Before performing the procedure on any of the data blocks, the database server determines to structure conjunction result cache 103 as depicted in FIG. 3. The database server determines the number of columns in table 101 and determines a number token entries in a token dictionary in the data block (data blocks), and structures and/or organizes the conjunction result cache in the way explained earlier.

Referring to FIG. 2, for each row in a data block, at 205, each column in the conjunction column set is read. If the value read for a column is not a token, then at 210, the column value is evaluated against the predicate conjunction. If a column value does not satisfy any of pertinent predicate conditions, then the row is referred to as being disqualified. Otherwise, another value for another column in the conjunction column set is read, if there are any.

In the current illustration, the first row read is row 111, and at step 210, the first value read is token $S_1$ from column LNAME. The value is a token; therefore execution proceeds to 215.

At 215, the database server determines what has been recorded in conjunction result cache 103 in the token's element of the column slot. If FALSE is recorded, then the row cannot satisfy the predicate conjunction and the row is disqualified. Decoding and/or evaluation of other column values are thereby avoided. The next row in the data block, if any, may be processed.

If TRUE is recorded, then the row may or may not satisfy the predicate conjunction. The ultimate determination of whether the row satisfies the predicate conjunction depends on other columns in the conjunction set, if there are any.

For row 111, the token element of LNAME's slot is set to UNCHECKED, because token $S_1$ has not been evaluated for the column LNAME for the current data block. Execution proceeds to 220.

At 220, token $S_1$ is decoded and evaluated against predicate conjunction 104. Specifically, one or more pertinent predicate conditions in the predicate conjunction are evaluated using the decoded column value; if each evaluation result for each pertinent predicate condition is that the column value satisfies the pertinent predicate condition, then the token's element in the column's slot is set to TRUE. The row may or may not satisfy the predicate conjunction. The ultimate determination of whether the row satisfies the predicate conjunction depends on other columns in the conjunction set, if any.

When a pertinent predicate condition in the predicate conjunction is not satisfied, then the token's element in the column slot is set to FALSE. No other pertinent predicate conditions are evaluated for the row. Here, token $S_1$ decodes to column value "TAYLOR". The first predicate condition evaluated is (LNAME like "T*"), which the string "TAYLOR" satisfies. The next predicate condition evaluated is (LNAME like "*S"), which "TAYLOR" does not satisfy. Tokens $S_1$'s element in the slot for LNAME is set to FALSE. The row is disqualified.

The next row processed is row 112. At 205, the first column read is column LNAME. The value of LNAME is token $S_1$. At 215, it is determined that FALSE is recorded in conjunction result cache 103. The row is disqualified.

The next row processed is row 113. At 205, the first column read is column LNAME. The value of LNAME is token $S_2$. At 215, it is determined that UNCHECKED is recorded in conjunction result cache 103. At 220, $S_2$ is decoded to "THOMAS". It is determined that THOMAS satisfies predicate conjunction 104. Token $S_2$ element in the column slot for LNAME is set to TRUE.

Eventually, the next row processed is row 114. At 205, the first column read is column LNAME. The value of LNAME is token $S_2$. At 215, it is determined that TRUE is recorded in conjunction result cache 103. Decoding of token $S_2$ and evaluation of pertinent predicate conditions for LNAME are avoided for the row.

Other Embodiments

In an embodiment, a token may represent a sequence of two or more contiguously stored column values in a data block. Such a token is referred to herein as a nested token. The first column represented by a nested token is referred to as the first placed column, the following other columns represented are referred to as a subsequently placed column, which may include a second placed column, and so forth. Importantly, for a nested token and any respective results recorded in the conjunction result cache for the columns represented by the nested token, the result is recorded is in an element of the nested token. Thus, if a nested token represents column values of three columns, and the result for the predicate conjunction for the three columns is TRUE, then the conjunction result cache contains TRUE in the nested token's element in each of the three column's slots in the conjunction result cache.

When, at 205, reading a nested token from a column in the conjunction column set that is a first placed column, a nested token is treated similarly as described before. At 215, it is determined what has been recorded in the conjunction result cache in the nested token's element of the first placed column's slot. If a FALSE is recorded, then the row is disqualified and execution proceeds as described before.

However, if UNCHECKED is recorded, at 205, all the column values represented by the nested token are decoded and stored. Then the column value for the first placed column is evaluated. At 225 or 230, a TRUE or FALSE is recorded at the element for the nested token in the first placed column's slot.

When, at 205, when reading a column in the conjunction column set that is a subsequently-placed column, the column value is already decoded from the nested token read for the first placed column. Even in this case, at 215, it is determined what has been recorded in the conjunction result cache in the subsequently placed column's slot and, importantly, the element of the nested token read for the first placed column. If a FALSE is recorded, the row is disqualified and execution proceeds as described before.

However, if UNCHECKED is recorded, the column value for the subsequently placed column is evaluated. At 225 or 230, a TRUE or FALSE is recorded at the element for the nested token in the subsequently placed column's slot.

In an embodiment, a nested token may contain an "inner token". A nested token that contains inner tokens but is itself not an inner token is referred to herein as a base nested token. In embodiment, the results recorded for all columns represented by a base nested token, if any, are recorded in an element of the base nested token.

For example:
a. Let LNAME=$S_0$, a nested token
b. Let $S_0=\{S_1, S_2, S_3\}$, $S3=\{S_4, S_5\}$, thus the token read for LNAME represents the four columns LNAME, FNAME, CITY, STATE.
c. Let predicate condition E include predicate conditions, each having a different one of the four columns as an argument.
d. Let the evaluation result for predicate conjunction E be TRUE for the four column values represented by $S_0$.
e. TRUE is recorded in the element for $S_0$ for the column slots shown in conjunction result cache 103.

The number of slots in a conjunction result cache can be based on other factors other than the number of columns in a table. The number of slots may be the number of columns in the conjunctive column set. Or, if the data blocks subject to a scan-and-filter operation contain fewer columns than the columns in a table, the number of slots may be the number of columns in the data blocks.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for performing a filtering operation on tabular data, comprising steps of:
evaluating a plurality of rows from a compression unit against a predicate conjunction, wherein said plurality of rows comprise a plurality of columns, wherein said predicate conjunction comprises a plurality of predicate conditions, wherein each column of a first set of columns is an argument for one or more predicate conditions of said plurality of predicate conditions, wherein columns values are stored in said plurality of rows as tokens;
wherein evaluating a plurality of rows from a compression unit against a predicate conjunction comprises:
for a first row of said plurality of rows:
decoding a token in a first column from said first set of columns to generate a column value;
determining that the column value does not satisfy a first predicate condition of said predicate conjunction;
in response to determining that the column value does not satisfy said first predicate condition:
recording in a conjunction result cache that the token represents a column value for said first column that causes said row to not satisfy said predicate condition; and
eliminating the row;
wherein a second row of said plurality of rows stores said token for said first column;
for said second row of said plurality of rows:
determining that the conjunction result cache records that the token represents a column value for said first column that causes said row to not satisfy said predicate condition; and
in response to determining that the conjunction result cache records that the token represents a column value for said first column that causes said row to not satisfy said predicate conjunction, eliminating the row.

2. The method of claim 1,
for a third row of said plurality of rows:
decoding another token in said first column to generate another column value;
determining that the another column value satisfies said first predicate condition;
in response to determining that the another column value satisfies said first predicate condition:
recording in said conjunction result cache that said another token represents a column value for said first column that may or may not cause a row to satisfy said predicate conjunction;
wherein a fourth row of said plurality of rows stores said another token for said first column; and
for said fourth row of said plurality of rows, determining that said another token represents a column value for said first column that may or may not cause a row to satisfy said predicate conjunction.

3. The method of claim 1, wherein the compression unit stores a token dictionary that maps said columns values that are stored in said plurality of rows to said tokens.

4. The method of claim 3, wherein said conjunction result cache includes an element for each combination of a token entry in said token dictionary and a number of columns of said plurality of columns.

5. The method of claim 3, wherein said tokens include at least one token representing two of more column values.

6. The method of claim 1, wherein said compression unit is a database data block.

7. The method of claim 1, wherein said compression unit belongs to a body of compression units, each compression unit of said body of compression units storing respective rows having said plurality of columns, each compression unit of said body of compression units storing a respective token dictionary, wherein the steps further include:
determining a number of token dictionary entries in each respective token dictionary of said body of compression units; and
generating said conjunction result cache such that said conjunction result cache has an element for each combination of a number of columns of said plurality of columns and said number of token dictionary entries.

8. The method of claim 7, wherein the respective token dictionary of at least a portion of said body of compression units includes a token representing multiple column values.

9. One or more non-transitory computer-readable media storing instructions for performing a filtering operation on tabular data, the instructions, when executed by one or more processors, causing one or more computing devices to perform operations comprising:
evaluating a plurality of rows from a compression unit against a predicate conjunction, wherein said plurality of rows comprise a plurality of columns, wherein said predicate conjunction comprises a plurality of predicate conditions, wherein each column of a first set of columns is an argument for one or more predicate conditions of said plurality of predicate conditions, wherein columns values are stored in said plurality of rows as tokens;
wherein evaluating a plurality of rows from a compression unit against a predicate conjunction comprises:
for a first row of said plurality of rows:
decoding a token in a first column from said first set of columns to generate a column value;
determining that the column value does not satisfy a first predicate condition of said predicate conjunction;
in response to determining that the column value does not satisfy said first predicate condition:
recording in a conjunction result cache that the token represents a column value for said first column that causes said row to not satisfy said predicate condition; and
eliminating the row;
wherein a second row of said plurality of rows stores said token for said first column;
for said second row of said plurality of rows:
determining that the conjunction result cache records that the token represents a column value for said first column that causes said row to not satisfy said predicate condition; and
in response to determining that the conjunction result cache records that the token represents a column value for said first column that causes said row to not satisfy said predicate conjunction, eliminating the row.

10. The one or more non-transitory computer-readable media of claim 9, wherein the instructions further cause the one or more computing devices to perform operations comprising:
for a third row of said plurality of rows:
decoding another token in said first column to generate another column value;
determining that the another column value satisfies said first predicate condition;
in response to determining that the another column value satisfies said first predicate condition:
recording in said conjunction result cache that said another token represents a column value for said first column that may or may not cause a row to satisfy said predicate conjunction;
wherein a fourth row of said plurality of rows stores said another token for said first column; and
for said fourth row of said plurality of rows, determining that said another token represents a column value for said first column that may or may not cause a row to satisfy said predicate conjunction.

11. The one or more non-transitory computer-readable media of claim 9, wherein the compression unit stores a token dictionary that maps said columns values that are stored in said plurality of rows to said tokens.

12. The one or more non-transitory computer-readable media of claim 11, wherein said conjunction result cache includes an element for each combination of a token entry in said token dictionary and a number of columns of said plurality of columns.

13. The one or more non-transitory computer-readable media of claim 11, wherein said tokens include at least one token representing two of more column values.

14. The one or more non-transitory computer-readable media of claim 9, wherein said compression unit is a database data block.

15. The one or more non-transitory computer-readable media of claim 9, wherein said compression unit belongs to a body of compression units, each compression unit of said body of compression units storing respective rows having said plurality of columns, each compression unit of said body of compression units storing a respective token dictionary, wherein the operations further include:
determining a number of token dictionary entries in each respective token dictionary of said body of compression units; and
generating said conjunction result cache such that said conjunction result cache has an element for each combination of a number of columns of said plurality of columns and said number of token dictionary entries.

16. The one or more non-transitory computer-readable media of claim 15, wherein said conjunction result cache includes an element for each combination of a token entry in said token dictionary and a number of columns of said plurality of columns.

17. A system for performing a filtering operation on tabular data, comprising:
one or more processors;
one or more non-transitory computer-readable media storing instructions, which, when executed by the one or more processors, cause the system to perform operations comprising:
evaluating a plurality of rows from a compression unit against a predicate conjunction, wherein said plurality of rows comprise a plurality of columns, wherein said predicate conjunction comprises a plurality of predicate conditions, wherein each column of a first set of columns is an argument for one or more predicate conditions of said plurality of predicate conditions, wherein columns values are stored in said plurality of rows as tokens:
for a first row of said plurality of rows:
decoding a token in a first column said first set of columns to generate a column value;
determining that the column value does not satisfy a first predicate condition of said predicate conjunction;
in response to determining that the column value does not satisfy said first predicate condition:
recording in a conjunction result cache that the token represents a column value for said first column that causes said row to not satisfy said predicate condition; and
eliminating the row;
wherein a second row of said plurality of rows stores said token for said first column;
for said second row of said plurality of rows:
determining that the conjunction result cache records that the token represents a column value for said first column that causes said row to not satisfy said predicate condition; and
in response to determining that the conjunction result cache records that the token represents a column value for said first column that causes said row to not satisfy said predicate conjunction, eliminating the row.

18. The system of claim 17, wherein the instructions further cause the system to perform operations comprising:
for a third row of said plurality of rows:
decoding another token in said first column to generate another column value;
determining that the another column value satisfies said first predicate condition;
in response to determining that the another column value satisfies said first predicate condition:
recording in said conjunction result cache that said another token represents a column value for said first column that may or may not cause a row to satisfy said predicate conjunction;
wherein a fourth row of said plurality of rows stores said another token for said first column; and
for said fourth row of said plurality of rows, determining that said another token represents a column value for said first column that may or may not cause a row to satisfy said predicate conjunction.

19. The system of claim 17, wherein the compression unit stores a token dictionary that maps said columns values that are stored in said plurality of rows to said tokens.

20. The system of claim 19, wherein said conjunction result cache includes an element for each combination of a token entry in said token dictionary and a number of columns of said plurality of columns.

21. The system of claim 19, wherein said tokens include at least one token representing two of more column values.

22. The system of claim 17, wherein said compression unit is a database data block.

23. The system of claim 17, wherein said compression unit belongs to a body of compression units, each compression unit of said body of compression units storing respective rows having said plurality of columns, each compression unit of said body of compression units storing a respective token dictionary, the steps further comprising:
determining a number of token dictionary entries in each respective token dictionary of in said body of compression units; and
generating said conjunction result cache such that said conjunction result cache has an element for each combination of a number of columns of said plurality of columns and said number of token dictionary entries.

24. The system of claim 23, wherein the respective token dictionary of at least a portion of said body of compression units includes a token representing multiple column values.

25. A method for performing a filtering operation on tabular data, comprising:
evaluating a plurality of rows from a compression unit against a predicate, wherein said plurality of rows comprise a plurality of columns, wherein said predicate comprises at least one predicate condition, wherein each column of a set of columns is an argument for one or more predicate conditions of said predicate, wherein columns values are stored in said plurality of rows as tokens;
wherein evaluating a plurality of rows from a compression unit against a predicate comprises:
for a first row of said plurality of rows:
decoding a token in a first column from said set of columns to generate a column value;
determining that the column value does not satisfy a predicate condition of said predicate;
in response to determining that the column value does not satisfy said predicate condition:
recording in a cache that the token represents a column value for said first column that causes said row to not satisfy said predicate; and
eliminating the row;
wherein a second row of said plurality of rows stores said token for said first column;
for said second row of said plurality of rows:
determining that the cache records that the token represents a column value for said first column that causes said row to not satisfy said predicate; and
in response to determining that the cache records that the token represents a column value for said first column that causes said row to not satisfy said predicate, eliminating the row.

26. The method of claim 25, wherein said predicate is a predicate conjunction, and said set of columns includes a plurality of columns.

27. One or more non-transitory computer-readable media storing instructions for performing a filtering operation on tabular data, the instructions, when executed by one or more processors, causing one or more computing devices to perform operations comprising:
evaluating a plurality of rows from a compression unit against a predicate, wherein said plurality of rows comprise a plurality of columns, wherein said predicate comprises at least one predicate condition, wherein each column of a set of columns is an argument for one or more predicate conditions of said predicate, wherein columns values are stored in said plurality of rows as tokens;

wherein evaluating a plurality of rows from a compression unit against a predicate comprises:

for a first row of said plurality of rows:
    decoding a token in a first column from said set of columns to generate a column value;
    determining that the column value does not satisfy a predicate condition of said predicate;
    in response to determining that the column value does not satisfy said predicate condition:
        recording in a cache that the token represents a column value for said first column that causes said row to not satisfy said predicate; and
        eliminating the row;

wherein a second row of said plurality of rows stores said token for said first column;

for said second row of said plurality of rows:
    determining that the cache records that the token represents a column value for said first column that causes said row to not satisfy said predicate; and in response to determining that the cache records that the token represents a column value for said first column that causes said row to not satisfy said predicate, eliminating the row.

28. The one or more non-transitory computer-readable media of claim 27, wherein said predicate is a predicate conjunction, and said set of columns includes a plurality of columns.

29. A system for performing a filtering operation on tabular data, comprising:
    one or more processors;
    one or more non-transitory computer-readable media storing instructions, which, when executed by the one or more processors, cause the system to perform operations comprising:

evaluating a plurality of rows from a compression unit against a predicate, wherein said plurality of rows comprise a plurality of columns, wherein said predicate comprises at least one predicate condition, wherein each column of a set of columns is an argument for one or more predicate conditions of said predicate, wherein columns values are stored in said plurality of rows as tokens;

wherein evaluating a plurality of rows from a compression unit against a predicate comprises:

for a first row of said plurality of rows:
    decoding a token in a first column from said set of columns to generate a column value;
    determining that the column value does not satisfy a predicate condition of said predicate;
    in response to determining that the column value does not satisfy said predicate condition:
        recording in a cache that the token represents a column value for said first column that causes said row to not satisfy said predicate; and
        eliminating the row;

wherein a second row of said plurality of rows stores said token for said first column;

for said second row of said plurality of rows:
    determining that the cache records that the token represents a column value for said first column that causes said row to not satisfy said predicate; and in response to determining that the cache records that the token represents a column value for said first column that causes said row to not satisfy said predicate, eliminating the row.

30. The system of claim 29, wherein said predicate is a predicate conjunction, and said set of columns includes a plurality of columns.

* * * * *

UNITED STATES PATENT AND TRADEMARK OFFICE
CERTIFICATE OF CORRECTION

| | | |
|---|---|---|
| PATENT NO. | : 8,812,523 B2 | Page 1 of 1 |
| APPLICATION NO. | : 13/631434 | |
| DATED | : August 19, 2014 | |
| INVENTOR(S) | : Marwah et al. | |

It is certified that error appears in the above-identified patent and that said Letters Patent is hereby corrected as shown below:

On the Title Page, Item (56)

On page 2, column 2, under Other Publications, line 10, delete "Applicaltions," and insert -- Applications, --, therefor.

On page 2, column 2, under Other Publications, line 56, delete "Perfomrance" and insert -- Performance --, therefor.

In the Claims

In column 13, line 21, in Claim 17, after "tokens:" insert -- wherein evaluating a plurality of rows from a compression unit against a predicate conjunction comprises: --, therefor.

In column 14, line 14, in Claim 23, delete "steps" and insert -- operations --, therefor.

In column 14, line 16, in Claim 23, after "dictionary of" delete "in".

Signed and Sealed this
Tenth Day of March, 2015

Michelle K. Lee
*Deputy Director of the United States Patent and Trademark Office*